Patented Feb. 24, 1942

2,274,368

UNITED STATES PATENT OFFICE 2,274,368

METHOD OF PRESERVING RUBBER AND PRODUCT OBTAINED THEREBY

Joseph R. Ingram, Nitro, W. Va., assignor to Monsanto Chemical Company, St. Louis, Mo., a corporation of Delaware No Drawing. Application May 13, 1938, Serial No. 207,773

16 Claims. (Cl. 260—799)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation is indicative of the result that would normally be expected of that particular stock during actual service. Such a test produces an effect on a vulcanized rubber stock comparable with that resulting from several years of natural aging of the rubber depending upon the condition of the test.

In accordance with the present invention it has been discovered that indene thio phenols comprise a valuable group of antioxidants. The structural formula of the new class of anti-oxidants or age-resisters is believed to be as follows

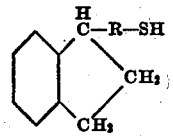

where R is an aryl group, which formula is analogous to that assigned to the indene phenols, however the present invention is not limited to any assumption as to chemical structure but pertains broadly to the products obtainable by reacting an indene with a thio phenol. The term "thio phenol" is used in its broad sense to include thio naphthol and other materials containing a mercapto group in an aryl nucleus. These new antioxidants are especially useful for white rubber stocks since they usually are resistant to discoloration. Typical examples of the preferred class of materials are indene thio phenol, indene thio β naphthol, indene m thio cresol, indene butyl thio phenol and indene chlor thio phenol.

As a specific example of one means by which the preferred class of materials are obtainable but which is intended to illustrate the invention and not to limit the same, indene was reacted with thio phenol as described below.

Sixty-six parts by weight of indene (substantially 0.57 molecular proportions) and sixty-six parts by weight of thio phenol (substantially 0.60 molecular proportions) and twenty-two parts by weight of hydrochloric acid of substantially 28–30% concentration were placed in a suitable container fitted with a reflux condenser and the mixture was heated on a hot water bath for eight hours. At the end of this period the oil layer was separated from the aqueous layer and any acid neutralized by adding substantially two parts by weight of sodium carbonate. Unreacted indene and thio phenol were removed by distilling to 170° C. under atmospheric pressure. The desired reaction product comprising indene thio phenol was then distilled at 6 mm. pressure and was found to boil at 160–165° C. with a bath temperature of 288° C.

Other and further typical examples of the preferred class of materials are obtainable as described above for example, indene was reacted with thio β naphthol and with m thio cresol in a manner substantially as described for the preparation of indene thio phenol.

Where convenient or desirable other methods of preparing the preferred class of materials may be employed. Thus an inert solvent and other catalysts than hydrochloric acid may be utilized. Furthermore, the reaction temperatures and times specifically mentioned are in nowise limitative.

As a specific embodiment of the invention showing the antioxidants or age-resisting properties of indene thio phenols but which is intended to illustrate the invention and not to limit the same, rubber stocks were compounded including typical examples of the preferred class of materials obtained as described above.

| | Stock A | Stock B |
|---|---|---|
| | Parts by weight | Parts by weight |
| Pale crepe | 100 | 100 |
| Zinc oxide | 60 | 60 |
| Lithopone | 20 | 20 |
| Sulfur | 2 | 2 |
| Benzothiazyl thiol benzoate | .827 | .827 |
| Diphenyl guanidine phthalate | .675 | .675 |
| Paraffin | .25 | .25 |
| Indene thio phenol | 1.0 | |
| Indene thio β naphthol | | 1.0 |

The rubber stocks so compounded were vulcanized in a press at the temperature of twenty pounds steam pressure per square inch and the modulus and tensile properties of the cured rubber stocks compared with those of the same cured stocks which had been aged in an air bomb at 250° F. and eighty pounds pressure. The comparison of the aged and unaged stocks is given in Table I.

*Table I*

| Cure | | Stock | Modulus of elasticity in lbs./in.² at elongations of— | | Tensile at break in lbs./in.² | Ult. elong. percent |
| --- | --- | --- | --- | --- | --- | --- |
| Time in minutes | Hours air bomb aged | | 300% | 500% | | |
| 30 | 0 | A | 575 | 1,930 | 4,225 | 695 |
| 30 | 6 | A | 555 | 1,545 | 2,200 | 580 |
| 30 | 0 | B | 500 | 1,590 | 3,600 | 675 |
| 30 | 6 | B | 575 | 1,940 | 3,800 | 600 |
| 45 | 0 | A | 700 | 2,070 | 4,275 | 680 |
| 45 | 6 | A | 545 | 1,500 | 2,350 | 570 |
| 45 | 0 | B | 625 | 1,970 | 4,100 | 680 |
| 45 | 6 | B | 670 | 2,020 | 3,525 | 630 |

The above data show the desirable antioxidant properties of the preferred class of materials when incorporated in a typical white rubber stock. In addition to the above tests the unaged rubber stocks described above were exposed to ultra violet light and found to be resistant to discoloration.

As a further specific embodiment of the invention showing the antioxidant or age resisting properties of indene thio phenols but which is intended to illustrate the invention and not to limit the same, a rubber stock was compounded comprising

| | Parts by weight |
| --- | --- |
| Pale crepe | 100 |
| Zinc oxide | 60 |
| Lithopone | 20 |
| Sulfur | 2 |
| Benzothiazyl thiol benzoate | 0.825 |
| Diphenyl guanidine phthalate | 0.675 |
| Paraffin | 0.25 |
| Indene meta thio cresol | 1.0 |

The rubber stock so compounded was vulcanized in a press at the temperature of twenty pounds steam pressure per square inch and the modulus and tensile properties of the cured rubber stock compared with those of the same cured stock which had been aged in an air bomb at 250° F. and eighty pounds pressure. The comparison of the aged and unaged stocks is given in Table II.

*Table II*

| Cure | | Modulus of elasticity in lbs./in.² at elongations of— | | Tensile at break in lbs./in.² | Ult. elong. percent |
| --- | --- | --- | --- | --- | --- |
| Time in minutes | Hours air bomb aged | 200% | 400% | | |
| 30 | 0 | 480 | 1,425 | 3,320 | 690 |
| 30 | 4 | 565 | 1,860 | 2,950 | 605 |
| 30 | 6 | 260 | 610 | 1,130 | 600 |
| 45 | 0 | 520 | 1,610 | 3,775 | 700 |
| 45 | 4 | 515 | 1,570 | 2,810 | 630 |
| 45 | 6 | 200 | 475 | 550 | 535 |

The above data show the desirable antioxidant properties of the preferred class of materials when incorporated in a typical white rubber stock. In addition to the above test the unaged rubber stock described above was exposed to ultra violet light and found to be resistant to discoloration.

From the specific examples hereinbefore set forth it is shown that rubber compositions containing small proportions of the preferred class of materials markedly resist the deteriorating influences of heat, oxidation and light.

Obviously practice of this invention is not limited to the specific compositions given above, such compositions being merely illustrative of the manner of employing the antioxidants or age-resisters of this invention. The antioxidants or age-resisters may be employed in different proportions than herein described and in conjunction with other vulcanizing agents than those specifically disclosed, for this invention is applicable generally to pure rubber or rubber compositions of the most varied nature. Furthermore the preferred class of materials may be employed in rubber stocks in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products which deteriorate upon aging whether or not admixed with fillers, pigments or accelerating agents.

The present invention is limited solely by the claims attached hereto as part of the present specification.

What is claimed is:

1. The method of preserving a rubber which comprises treating a rubber with an indene thio phenol.

2. The method of preserving a rubber which comprises treating a rubber with an indene thio phenol derived from a mono carbocyclic thio phenol.

3. The method of preserving a rubber which comprises treating a rubber with an indene thio phenol derived from a polycarbocyclic thio phenol.

4. The method of preserving a rubber which comprises treating a rubber with an indene thio phenol.

5. The method of preserving a rubber which comprises treating a rubber with indene m-thio cresol.

6. The method of preserving a rubber which comprises treating a rubber with an indene thio β naphthol.

7. An age-resisting rubber composition comprising a rubber and an indene thio phenol.

8. An age-resisting rubber composition comprising a rubber and an indene thio phenol derived from a mono carbocyclic thio phenol.

9. An age-resisting rubber composition comprising a rubber and an indene thio phenol derived from a polycarbocyclic thio phenol.

10. An age-resisting rubber composition comprising a rubber and indene thio phenol.

11. An age-resisting rubber composition comprising a rubber and indene m-thio cresol.

12. An age-resisting rubber composition comprising a rubber and indene thio β naphthol.

13. The method of preserving india rubber which comprises treating india rubber with an indene thio phenol.

14. The method of preserving india rubber which comprises treating india rubber with indene thio β naphthol.

15. An age resisting rubber composition comprising india rubber and an indene thio phenol.

16. An age resisting rubber composition comprising india rubber and indene thio β naphthol.

JOSEPH R. INGRAM.